Patented Aug. 2, 1949

2,477,809

UNITED STATES PATENT OFFICE 2,477,809

PROCESS OF RECLAIMING ELASTOMERS

John H. Kelly, Jr., Wabash, Ind., assignor to The General Tire & Rubber Company, Akron, Ohio, a corporation of Ohio No Drawing. Application January 26, 1946,
Serial No. 643,743

5 Claims. (Cl. 260—2.3)

This invention relates to the reclaiming of vulcanized rubbers and rubberlike compounds. It particularly relates to the reclaiming of vulcanized polymers and copolymers of monomers having a conjugated diene present in substantial proportion.

The reclaiming of polymers of a conjugated diene such as chloroprene, butadiene-1,3, isoprene, etc. and copolymers of such conjugated dienes with styrene, acrylonitrile or other aliphatic unsaturated materials which contain a single olefin group has heretofore caused considerable difficulty. This is especially the case when the scrap material to be reclaimed is not of a single type but, for example, consists of a mixture of one or more rubbery materials such as natural rubber, GR-S, neoprene, etc.

The so-called alkali process of reclaiming widely used before the advent of synthetic rubbers has been found to be unsuitable for reclaiming synthetic rubbers such as chloroprene or butadiene polymers or copolymers. Reclaimers have, in fact, been forced to outrightly discard mixtures of otherwise suitable vulcanized Hevea rubber scrap when it was contaminated with varying amounts of such scrap vulcanized synthetic rubbers. To plasticize scrap synthetic rubber or such mixtures it has been proposed to use certain catalytic agents at extremely elevated temperatures, with or without air under pressure in the reclaiming mixture. Such processes before proposed, have not as far as I am aware been successful. Also, straight digester processes at temperatures ranging from 435° F. to 485° F. have been proposed, but such high temperatures often embrittled synthetic rubber scraps. To alleviate this condition, appreciable quantities of swelling agents, such as 10–50% of crude coal tar solvent naphtha, carrying appreciable amounts of dissolved softeners such as pine tar, coumar, asphaltic fluxes, etc. have been proposed. The large amounts of such swelling agents and plasticizers required have been deterrents to the commercial success of the process.

Attempts to plasticize synthetic rubber scrap with phenyl hydrazine or its complexes, with or without the presence of large amounts of solvent naphtha, with or without heated air under pressure, with kneading at long intervals at elevated temperatures, while ingenious, have been restricted by cost and other limitations.

It has also been proposed to reclaim Hevea rubber by masticating this material in the presence of water-soluble alkyl amines, alkoxy polyamines and alkyl aminothiols at temperatures of about 400° F. This process has been seriously limited by inability to plasticize synthetic rubber scraps within operating temperatures of about fifteen or sixteen minutes at temperatures as low as 400° F. It has also been seriously limited by the toxic volatilization accompanying the use of these reagents.

Another method heretofore proposed for the reclaiming of natural rubber or GR-S has been to incorporate the ground vulcanized scrap in a Banbury mixer and to masticate it with very high rotor speeds and ram pressures to obtain a temperature throughout the mass of 400° F. to 550° F. The maintenance of the scrap at such a temperature for a substantial period of time, such as thirty minutes or more, under mastication has a plasticizing action on the scrap, which enables it to be utilized for some purposes after a suitable refining treatment. The high operating temperatures are costly, both from the standpoint of power input and from the question of bearing life and fatigue resistance of the Banbury mixer itself. Furthermore, the temperatures above 400° F. are not conducive to the most desirable properties in the reclaim rubber produced.

It is an object of the present invention to provide a method of reclaiming rubber or synthetic rubbers which is effective in a Banbury mixer at temperatures less than 400° F.

It is another object of the present invention to provide a method of reclaiming rubber wherein the reclaiming is accomplished at time intervals materially shorter than those heretofore used and at temperatures below those of processes before proposed.

It is a still further object of the present invention to provide a method of reclaiming natural or synthetic rubbers which results in a reclaim having processing qualities nearly equivalent to the unvulcanized parent compound.

Because of the difficulty in recognizing the various types of rubber scrap, it is exceedingly difficult to prevent mixtures of oil-resistant and non-oil-resistant scrap from occurring. In accordance with the processes heretofore proposed in the prior art, the reclaiming of mixtures of rubbery polymers and copolymers, such as mixtures of neoprene and Buna-S, were not, as far as I am aware, successful. It is another and important object of the present invention to provide a method of satisfactorily reclaiming mixtures of various vulcanized rubbery materials, such as neoprene, GR-S, natural rubber and the like.

The above and other objects, which will be apparent from the following description of the invention, are accomplished in accordance with the present invention by subjecting the vulcanized rubbery material or materials to friction and heat and preferably mechanical pressure in the presence of a catalyst comprising at least one member of the group consisting of long chain water insoluble amides, nitriles and amines, acid salts of such amines and cationic surface-active agents such as the quaternary ammonium, sulfonium or phosphonium complexes. Of the water insoluble amines the tertiary amines particularly the tertiary aliphatic amines, such for example as tertiary amyl amine, are usually most effective especially in conjunction with an organic or inorganic acid such as an orthophosphoric acid and a catalyzer, such as oxidized rosin. The heating preferably occurs with simultaneous mastication, or is the result of mastication and a temperature of at least 250° or 300° F. is usually required. A temperature of 315° or 320° to 390° F. is preferred. Preferably, the reclaiming is accomplished with mastication in a mixer, such as a Banbury mixer, the power input to the mixer being a means of providing a substantial portion or all of the desired heat.

In carrying out my process, the ground scrap rubber or rubbery polymer, or mixtures thereof, is incorporated into a suitable mixer which has means for maintaining at least a mechanically applied pressure generally 20 to 50 p. s. i. on the scrap and which is preferably equipped with a heated jacket. A small amount of one or more of the aforementioned catalysts such as one or more of the above cation-active materials incorporated with the scrap in the mixer with or without a non-oxidizing acid, has such marked plasticizing action that a suitable reclaim may be produced at a temperature substantially less than 400° F. in a relatively short time. In fact, the plasticizing action of the cationic material is so great that the maximum temperature reached by mastication in the Banbury, even though it is preheated to about 200° F. to 250° F., generally runs in the neighborhood of about 325° F. to 370° F.; a temperature close to 400° F. is exceptional. In addition to the cationic material or other aforementioned catalyst, small amounts of one or more of the usual asphaltic fluxes, mineral oil, rosin, or a thermoplastic resin are usually present in the process.

The vulcanized rubber scrap may be a sulfur vulcanized synthetic rubber, a compounded Hevea rubber, chloroprene or the like. The process is effective in reclaiming the vulcanized rubberlike polymers of one or more elastogenic materials including the polymers of butadiene compounds (including butadiene-1,3, isoprene, dimethyl butadiene, chloroprene, etc.) or copolymers of one or more such compounds with any copolymerizable monovinyl compound such as methyl methacrylate, acrylonitrile, aryl vinyl compounds, for example, styrene, nuclear substituted styrenes including 2,5 and 2,4 and 2,3 dichlorostyrene, etc. Elastogenic is used herein as in Patent 2,384,277 to mean capable of forming rubberlike materials. Mixtures of such scrap may also be used.

The organic cationic materials are the preferred single catalysts because the reclaim has especially desirable properties and plasticization occurs at a very fast rate. Examples of the cationic materials suitable as catalysts in my process are the quaternary ammonium or phosphonium compound, those having pentavalent nitrogen, or phosphorus and ternary sulfonium compounds. They usually belong to the classes represented by the following structural formulae:

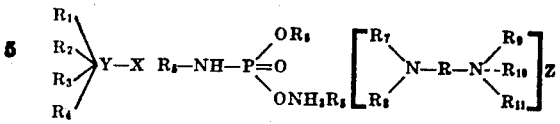

In the first formula: $R_1$ is an organic group preferably selected from long-chain alkyl groups, i. e. those having 8 to 20 or more carbon atoms, aryl and aralkyl groups and acid radicals containing such groups; $R_2$, $R_3$, and $R_4$ are short-chain alkyls (less than 8 carbon atoms) which may or may not have a substituent group; Y is nitrogen, sulfur or phosphorous; and X is selected from monovalent anions including halogen acyloxy (RCOO— where R is an organic radical) etc.

In the second formula: $R_5$ is a long-chain alkyl; and $OR_6$ is an ethoxy or other water-solubilizing group.

In the third formula: R is an aliphatic group; $R_7$ is selected from the group consisting of hydrogen, acyl or alkyl; $R_8$ is acyl; $R_9$, $R_{10}$, and $R_{11}$ are selected from hydrogen, alkyl, aryl or aralkyl, and Z is any monovalent anion such for example as a halogen or an organic acid radical.

In place of the quatenary ammonium phosphonium salt, etc. I may use an amine or other compound capable of forming with organic or inorganic acids a quatenary ammonium or phosphonium salt together with such acid on such cases. The amine or phosphine etc. is considerably more effective when it is insoluble in water and tertiary amines particularly water insoluble tertiary aliphatic amines such as triamylamine are especially effective.

Examples of compounds coming within the first of the above formula are:

Stearyl trimethyl ammonium bromide
Lauryl trimethyl ammonium chloride
Benzyl trimethyl ammonium chloride
Benzyl lauryl dimethyl ammonium chloride
Compounds set forth in Katzman U. S. Patents 2,189,664 and 2,302,697, Harris U. S. Patent 2,023,075 and Epstein et al. Patent 2,176,896.

Examples of compounds within the third general formula listed above are compounds made by reacting with an organic acid such for example as oxalic, acetic, etc. an organic compound such as:

Mono stearyl ethylene diamine,
Oleyl dipysesidyl-N-ethyl amide,
Oleyl-phenyl ethylene diamide,
Oleyl diethylene diamide etc.,
As listed in Hartman et al. Patent 1,534,524.

The cationic compounds prepared by reacting with acid a water insoluble nitrogen, phosphorus, or sulfur compound capable of forming with acid an addition i. e. one where the nitrogen, sulfur or phosphorus has an increased valence in the cationic compound, ordinarily give the most desirable results in any process.

The cation-active compounds have an affinity for both the scrap and the softening or swelling agents commonly used in reclaiming procedures. Even relatively small amounts, such as .25%, based on the rubber scrap, of one or more of the above catalysts, particularly the cationic materials, have substantial plasticizing action. Preferably, however, the cationic materials are present in amounts of about 1% to about 5% of the scrap, and amounts greater than 10% are not usually considered economical at present prices.

The long-chain water insoluble amides, nitriles and amines or the acid or rosin salts thereof, when present in combination with the cationic agents, also act to enhance the desirable catalytic effects of the cationic compounds and to emphasize the reaction. Water and inorganic non-oxidizing acids, such for example as polybasic acids such as a phosphoric acid and especially orthophosphoric acid, also act to further improve the plasticizing action of the cationic materials. In my preferred process, therefore, a small amount of the aforementioned water insoluble materials (usually a water insoluble amine) or an inorganic acid or both is combined with the cationic compound. A small amount of water further accelerates the plasticizing reaction. Mineral oils, rosin, coal tar distillates, and resins may or may not be used as supplementary processing aids during the reclaiming, as in ordinary practice.

The following examples, in which parts are by weight, illustrate the present invention.

*Example 1*

|  | Batch "A" | Batch "B" |
| --- | --- | --- |
| Buna-S Tire Peel Scrap | 1,500 | 1,500 |
| Rosin | 75 | 75 |
| Pine Tar | 30 | 30 |
| Coal Tar Distillate | 75 | 75 |
| 85% Ortho Phosphoric Acid |  | 12 |
| Water |  | 100 |
| Cation Compound |  | 30 |

The coal tar distillate is the commercial product known as Bardol and has a minimum distillation of 210° C. and a maximum of 325° C. and an Engler viscosity of 4.0 max. It is widely used as a softener for the various synthetic polymers. The cation-active material is the stearyl amine salt of the stearyl amide of ethyl metaphosphate.

A model B Banbury was used in which the surface speed was set at 115 surface feet per minute, corresponding to 40 R. P. M. in a standard No. 11 Banbury. The Banbury prior to loading was thoroughly warmed by masticating a synthetic rubber therein until the average temperature prior to loading was between 200 and 250° F.

The tire peel scrap, comminuted to average 8 mesh, was added to the Banbury in two portions, the rosin, pine tar and softener being added immediately after the first portion-wise addition of the scrap. In "B," the cation-active material was added with the rosin, pine tar and softener, the acid and water following after the last addition of scrap.

Critical temperatures in the Banbury were as follows:

| Time | Batch "A" | Batch "B" |
| --- | --- | --- |
|  | ° F. | ° F. |
| 0 Minutes | 200 | 170 |
| 2 Minutes | 255 | 230 |
| 4 Minutes | 260 | 280 |
| 6 Minutes | 280 | 305 |
| 8 Minutes | 295 | 315 |
| 10 Minutes | 315 | 320 |
| 12 Minutes | 320 | 335 |
| 14 Minutes | 335 |  |
| 16 Minutes | 350 |  |

It will be observed that the "A" batch required 4 minutes longer masticating time and a higher temperature than the "B" batch.

Milling tests revealed that the "A" batch sheeted out after 4 passes but was not as easily processable as the "B" batch which smoothed out immediately and was cohesive after 1 pass thru tight rolls.

*Example 2*

|  | Batch "A" | Batch "B" |
| --- | --- | --- |
| Black Hevea Scrap from Mechanical Rubber Goods | 1,500 | 1,500 |
| Rosin | 75 | 75 |
| Pine Tar | 30 | 30 |
| 85% Orthophosphoric Acid |  | 12 |
| Coal Tar Distillate | 75 | 75 |
| Water |  | 100 |
| Cation-active compound |  | 30 |

The mechanical black scrap was the usual high carbon black type averaging 64% rubber hydrocarbon content and 28% black. It was similarly comminuted to pass through an eight mesh screen. The other ingredients and procedures were specifically as described in Example 1.

The maximum Banbury operating temperatures for batch "A" were 395 to 400° F. They were slightly less in the case of batch "B." At the end of eight minutes, batch "B" was completely plasticized and suitable for removal. It was allowed to remain in the Banbury for fourteen minutes, at which time the plasticization was so high that batch "B" could not be processed. Control batch "A" was unplasticized at eight minutes; at ten minutes it showed clear evidence of incipient charring. It was then taken out of the Banbury. It pulverized and was not refinable.

*Example 3*

Mixed molded mechanical scrap containing
| | |
| --- | --- |
| Buna-S | 1212 |
| Tire peel scrap | 382 |
| Rosin | 75 |
| Pine tar | 30 |
| Coal tar distillate | 75 |
| 85% orthophosphoric acid | 12 |
| Water | 100 |
| Cation active compound | 30 |

The tire peels were essentially third grade GRS type and the molded mechanical scrap consisted of 42% GRS, 24% black, etc. Both scrap types were comminuted to pass through an eight mesh screen.

The cation active compound consisted of 30 pts. of a 20% aqueous solution of the reaction product of diethanol amine oleate and dimethyl sulfate.

Banbury operating temperature attained 310° F. in 16 minutes. This proved sufficient for obtaining a reclaim that was cohesive and sheeted out rapidly.

*Example 4*

1800 pts. of vulcanized chloroprene molded scrap, averaging 62 durometer and containing approximately 47% polymerized chloroprene, was mixed with 36 pts. of benzyl trimethyl ammonium chloride in a Banbury preheated as in the previous example. The Banbury was operated for 16 minutes at a maximum temperature of 335° F. There was obtained a thoroughly dry and smoothly sheeting but weakly cohesive product, which was suitable for further formulation, etc.

1800 pts. of the same scrap with 5% rosin, 5% of the coal tar distillate Bardol, and 2% pine tar completely failed to plasticize at temperatures up to 400° F. and time intervals up to 16 minutes.

Example 5

| | |
|---|---|
| Tire peel scrap (butadiene-styrene copolymer) | 500 |
| Vulcanized mold butadiene - acrylonitrile scrap (compounded butadiene - acrylonitrile copolymer) | 500 |
| Mold (poly chloroprene) scrap | 600 |
| Rosin | 75 |
| Pine tar | 30 |
| Coal tar distillate | 70 |
| 85% phosphoric acid | 12 |
| Water | 100 |
| Cation-active compound | 30 |

The stearyl amine salt of the stearyl amide of ethyl metaphosphate was used as the cation-active material. The scrap tire peels were as in Example #1; the molded butadiene-acrylonitrile scrap averaged 58% polymer content and 23% carbon black content and the waste vulcanized chloroprene scrap averaged 60 durometer, and 22% black content.

The Banbury operating time totalled 10 minutes. After suitably compounding with sulfur, accelerator and zinc oxide, average tensiles of 650 p. s. i. and 280% elongation were obtained.

A very smooth processing reclaim was obtained, free of unrefinables.

Example 6

| | |
|---|---|
| Tire peels (butadiene-styrene type) | 1000 |
| Molded factory scrap (butadiene-acrylonitrile type) | 500 |
| Rosin | 75 |
| Pine tar | 30 |
| Coal tar distillate | 75 |
| 85% phosphoric acid | 12 |
| Water | 100 |
| Cation-active compound | 30 |

Both scraps were comminuted to 8 mesh. The cation active compound was the stearyl amine salt of the stearyl amide of ethyl metaphosphate.

The total Banbury time was 14 minutes. The temperatures the first 8 minutes were between 225° F. and 395° F.; for the last 6 minutes the temperatures were 395° F. to 400° F. An extremely smooth processing reclaim resulted.

Tensile strengths, after compounding with 1% of the reaction product of cyclohexylamine and mercaptobenzathiazol, 5% of zinc oxide and 2% of sulfur, based upon the hydrocarbon values of 62% and 58% respectively and vulcanizing 40 minutes at 320° F. were excellent, averaging 1090 p. s. i. Elongation averaged 310% and permanent set averaged 1/16".

The reclaim was extremely easy processing and resulted in good extrusion plasticities.

Example 7

1000 pts. of butadiene-styrene type of waste vulcanized tire peels and 500 pts. of the standard first grade Hevea type were substituted for the scrap of Example 6. The resultant material was too soft to process after a masticating time of 12 minutes of which 4 minutes were at 400° F., which represented the maximum operating temperature.

Example 8

| | Batch "A" | Batch "B" | Batch "C" |
|---|---|---|---|
| Molded mechanical scrap | 1,800 | 1,800 | 1,800 |
| N-octadecanamide | 54 | | |
| Mono-n-octadecylamine | | 54 | |
| N-octadecanenitrile | | | 54 |

The molded black scrap was essentially identical with that in Example #3. The reagents and scrap were admixed and loaded into the Banbury as in the previous examples.

Batch "A," was processed 16 minutes to 345° F. Batch "B" was processed for the same time and temperature. Batch "C" was processed for the same time interval but the maximum temperature was 335° F. The initial temperature of the Banbury was 200° F. in each instance. Excellent plasticization occurred but as softeners and fluxing agents were omitted, two or three passes through refining rolls were necessary.

Example 9

| | Batch "A" | Batch "B" | Batch "C" |
|---|---|---|---|
| Molded Mechanical scrap | 1,800 | 1,800 | 1,800 |
| N-octadecanamide | 54 | | |
| Mono-n-octadecylamine | | 54 | |
| N-octadecanenitrile | | | 54 |
| Cation active compound | 6 | 6 | 6 |

Materials were essentially as in Example 8, the cation active compound was the stearyl amine salt of the stearyl amide of the ethyl metaphosphate.

All batches were run 16 minutes starting from an initial operating temperature of 150° F. and the respective optimum temperatures reacted for A, B and C batches were 320° F., 340° F. and 320° F. respectively.

Plasticization was much more pronounced than in Example 8.

Example 10

| | |
|---|---|
| Molded mechanical scrap | 1500 |
| Rosin | 75 |
| Pine tar | 30 |
| Coal tar distillate | 75 |
| 85% ortho phosphoric acid | 12 |
| Water | 100 |
| Cetyl-betaine cation active complex | 5 |

The molded scrap was essentially as in Example 8. The Banbury processing time was 16 minutes and the 385° F. maximum temperature resulted in a very smooth and highly plastic reclaim. Other long-chain substituted betaines, such as hexadecyl, octyl, etc., when substituted for the cetyl-betaine, also produce similar results.

Example 11

The oxidized rosin especially in combination with phosphoric acid is in itself an excellent plasticizer for most vulcanized G. K. S. compounds but when the tertiary amines are also present all of the vulcanized compounds become more readily plasticizable.

1800 grams of mechanical scrap, essentially similar to that in Example 8, was admixed with 54 grams of the commercial "plasticizer #36" sold by the Resinous Product and Chemical Co. and possesses the following substituted amide structure:

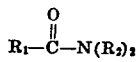

where $R_1$ and $R_2$ are selected from alkylenyl and alkyl groups, such as stearyl, oleyl, etc., it possesses the following characteristics: boiling point 220° C. at 4 mm., freeze point −4° C. to −15° C., acid number-less than 5, solubility in water 0.104%. It is completely soluble in alcohol, ketones, and aromatic and aliphatic solvents.

Banbury operation 16 minutes at 320° F. resulted in a refinable product.

Addition of 6 grams of the stearyl amine salt of the stearyl amide of ethyl metaphosphate and processing for 16 minutes at 345° F. in the Banbury resulted in obtaining a product from the same scrap that was plastic and cohesive when milled without a refining operation.

In the foregoing examples, unless otherwise specified, the Banbury was a Model B with a rotor speed of 77 S. F. P. M. By increasing the speed to 115 S. F. P. M. materially reduced time intervals for equivalent results or else much greater plasticization for the same interval of time may be had.

*Example 12*

| | |
|---|---|
| GRS tire peel scrap | 1700 |
| Oxidized rosin | 82 |
| Pine tar | 36 |
| Triamyl amine | 30 |
| 85% ortho phosphoric acid | 14 |
| Water | 50 |

The material was masticated together in a B Banbury for about 16 minutes. The maximum operating temperature reached 360° F. and the surface speed of the preheated Banbury was 110 ft. per minute. A thoroughly plasticized product having exceptionally desirable properties resulted.

The water insoluble amines are, like the cationic materials, similarly not restricted to the specific examples. Cetyl dimethyl amine, octadecyldimethyl amine, tetra decyl and octadecenyl amines, etc., may for example also be used. In place of or in combination with the cation active complexes of the above examples, one may use the aforementioned phosphonium and sulfonium types of complexes. Other types of quaternary ammonium salts, such as octadecyl trimethyl benzyl ammonium chloride are of value for certain types of waste vulcanized scrap as are the so-called aldehyde quaternary ammonium complexes.

Acylated derivatives, such as stearyl diethylene diamine, oleyl diethyl ethylene diamine and various other long-chain alkyl substituents reacted with phosphoric or other non-oxidizing acids are similarly usable provided the alkyl chain is sufficiently long enough to assure hydrocarbon solubility or compatibility. In particular the grouping

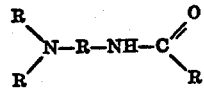

is of particular value as it leads to salts soluble in water and also to hydrocarbon compatibility as well if a sufficiently long-chain alkyl is also present.

Furthermore, it is to be understood that the particular form of product shown and described and the particular procedure set forth are presented for purposes of explanation and illustration and that various modifications of said product and procedure can be made without departing from my invention as defined in the appended claims.

What I claim is:

1. The method of reclaiming a vulcanized rubbery polymer of a conjugated diolefinic compound, which comprises subjecting said polymer to friction at a temperature above 250° F. in the presence of .25% to 5%, based on the weight of said vulcanized polymer, of a catalyst consisting of a mixture of a water-insoluble aliphatic amine and a phosphoric acid.

2. The method of claim 1 wherein an oxidized rosin is also present and wherein the phosphoric acid is ortho-phosphoric acid.

3. The method of claim 1 wherein the amine is a water-insoluble tertiary amine, the phosphoric acid is an ortho-phosphoric acid, and wherein the temperature of mastication is between 250° F. and 400° F.

4. A method of reclaiming a vulcanized rubbery polymer of a conjugated diolefinic compound, which comprises masticating said vulcanized rubbery polymer in a subdivided state, at a temperature of at least 250° F., in the presence of .25% to 5%, based on the weight of said polymer, of a water-soluble cationic surface active agent and in the presence of a nonoxidizing inorganic acid and water.

5. A method of reclaiming a vulcanized rubbery polymer of a conjugated diolefinic compound, which comprises masticating said vulcanized rubbery polymer in a subdivided state, at a temperature of at least 250° F., in the presence of a water-soluble cationic surface active agent and in the presence of a water-insoluble aliphatic amine, the total of said amine and said cationic agent being 1% to 10% of the weight of the rubbery polymer, and said cationic compound being present in the amount of .25% to 5% of the weight of said rubbery polymer.

JOHN H. KELLY, JR.

REFERENCES CITED

The following references are of record in the file of this patent:

UNITED STATES PATENTS

| Number | Name | Date |
|---|---|---|
| 2,200,715 | Greth et al. | May 14, 1940 |
| 2,211,592 | Castello | Aug. 13, 1940 |
| 2,304,550 | Dasher | Dec. 8, 1942 |
| 2,343,558 | Kirby et al. | Mar. 7, 1944 |
| 2,375,089 | Ebers | May 1, 1945 |
| 2,423,032 | Le Beau | June 24, 1947 |